May 15, 1951     A. L. HINDALL     2,553,192
METHOD OF CURING POSITIVE STORAGE BATTERY PLATES
Filed Sept. 9, 1947
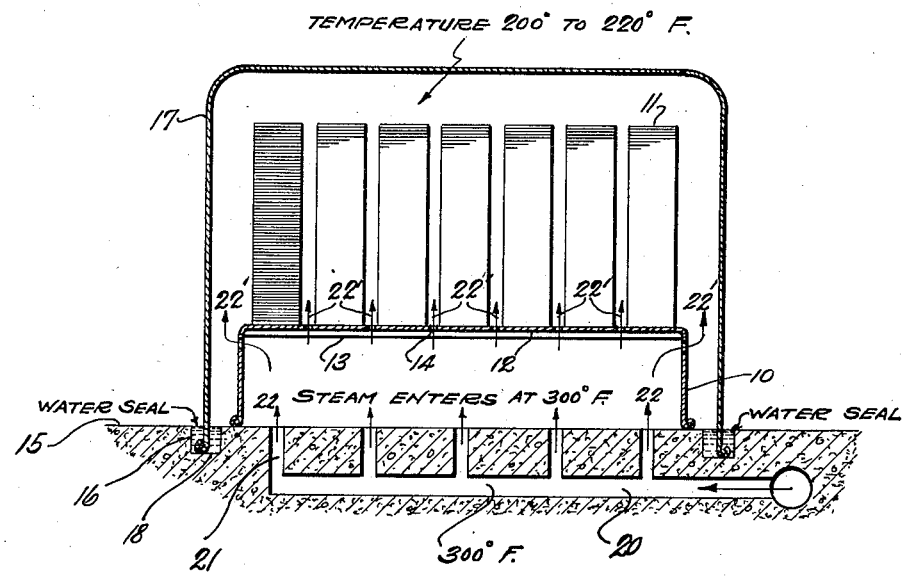
INVENTOR.
ALVA L. HINDALL
BY
*Spencer Hardman & Fehr*
*his attorneys*

Patented May 15, 1951

2,553,192

UNITED STATES PATENT OFFICE 2,553,192

METHOD OF CURING POSITIVE STORAGE BATTERY PLATES

Alva L. Hindall, Muncie, Ind., assignor to General Motors Corporation, Detroit, Mich., a corporation of Delaware Application September 9, 1947, Serial No. 772,952

2 Claims. (Cl. 136—33)

This invention relates to the manufacture of storage batteries and more particularly to the preparation of the positive plates for formation. In my copending application Serial No. 479,993, filed March 22, 1943, now Patent No. 2,481,218, I disclosed a process for curing the positive paste which, after mixing Barton litharge (37.5% yellow litharge, 37.5% red litharge and 25% free lead) with water and sulphuric acid and red lead, contains colloidal substances which are highly reactive with the forming electrolyte. These colloidal substances are believed to be hydrated litharge and lead sulphate. The curing process consists of the reduction of the moisture content from about 11 to 13% down to about 9%, following by a treatment in highly humid atmosphere of about 100% humidity at a temperature of 200 or 220° F. During this process the yellow litharge is changed to red litharge; some of the free lead is changed to red litharge and the colloidal substances are converted to basic lead sulphate of small crystal size which is easy to convert to lead peroxide in the forming electrolyte. After this process the positive plates are aged in air for a time sufficient to complete the preparation for easy formation or conversion of the active material to lead peroxide in the forming electrolyte. I have found that the above steps of curing and aging will enable easy formation of the positive active material when the paste mix contains at least 16% of red lead prior to curing.

An object of the invention is to provide easy formation of the positive plates the paste of which contains less than 16% of red lead. To accomplish this object, the positive plates are allowed to cool to room temperature after the curing step referred to. This is accomplished during the time the plates are transported from the curing apparatus to a break-apart machine which separates the plates which are cast and pasted in pairs. After the plates are separated, they are stacked on skids for aging. In about one and one-half hours, the plates are cooled to room temperature and are ready for the next step which I term "accelerated aging."

In the drawing:

The drawing shows diagrammatically the apparatus for accelerated aging.

The skid 10 which supports the stacks of positive plates 11, has a perforated platform 12 stiffened by corrugation ribs 13 and provided with perforations 14 so spaced as to be located between the stacks 11. The skid rests on a floor 15 provided with a water-sealed groove 16 extending around the skid which preferably contains about 2" of water. A metal box 17 is inverted over the plates and skid with its lower edge 18 resting on the bottom of the seal groove 16. Steam pipes 20 are laid in the floor having nozzles or side openings 21 extended through the floor. Steam at 300° F. flows through the pipe 20 under pressure of 2" of water, and upwardly as indicated by arrows 22 into the chamber provided by the box and the steam circulated upwardly through the holes in the skid, as indicated by the arrows 22. Since the box is not thermally insulated the temperature within the box will be about 200° to 220° F. In the event that boxes of different size and construction are used, the incoming steam temperature should be adjusted to maintain temperatures in the order of 200° to 220° F. within the box. The steam pressure within the box will be maintained at substantially 2" of water pressure since pressure in excess of that amount will cause some of the steam to escape through the water seal 16. The steam treatment in the chamber within the metal box 17 is continued for one hour during which time the free lead is believed to be converted to litharge of a relatively large crystal size so that it is not highly reactive with the electrolyte of the forming bath.

Following accelerated aging, the positive plates are aged in air for a time sufficient for certain further reactions to take place which result in minimizing the existence of substances which are highly reactive to the forming electrolyte and which if present would result in the formation of a form of lead sulphate which is very difficult to convert to lead peroxide. When cooling the plates after curing is followed by accelerated aging, the time required for aging in air is only about 36 hours instead of being 72 hours in the old process of aging only in air. Furthermore, satisfactory results are obtained although the amount of red lead is 16% or less of the mix whereas, the old process of aging in air only would be successful only when the amount of red lead in the mix is 16% or greater. It is apparent that the present invention is directed to a process including an accelerated aging step which is similar to the curing step disclosed in my copending application whereby a plate may be completely formed from initial pasting in a reduced time. This may be accomplished by subjecting the plate, which has a moisture content of about 9%, to air of approximately 100% humidity and at a temperature of 200 to 220° F. for curing the compounds in the plate paste into a rugged structure, cooling the plate to room temperature and then subjecting the plate to high humidity air at a temperature of from 200 to 220° F., for about one hour and finally aging the plates so treated in air at room temperature for about 36 hours. This treatment reduces the time previously required to about half since the old treatment required 72 hours aging in air.

It is therefore apparent that the present method effects a saving in material and time since it provides for the preparation of the positive active material for the forming step with the use of less red lead and in a shorter time than heretofore.

While the embodiment of the present invention as herein disclosed constitutes a preferred form, it is to be understood that other forms might be adopted, all coming within the scope of the claims which follow.

What is claimed is as follows:

1. In a method of preparing positive active material for formation, the steps consisting of curing positive plates pasted with a reaction mixture of 37½% yellow litharge, 37½% red litharge, 25% metallic lead, sulphuric acid, water and red lead in quantities of less than 16%, having in the order of 9% moisture therein, at a humidity of about 100% and at a temperature of 200 to 220° F., for about one hour to effect the formation of crystals of basic lead sulphate from the plate paste compounds and simultaneously to cause the plate paste to be cured to a rugged structure firmly attached to the plate, cooling the plate to room temperature in air, subjecting the plate for about one hour to a highly humid atmosphere at a temperature of from 200 to 220° F., and finally aging the plates at room temperature in air for about 36 hours.

2. The method of preparing positive active material for formation which consists in processing pasted positive plates for producing active material including small sized crystals of basic lead sulphate therein, heating the processed plates in a highly humid atmosphere at a temperature of between 200 to 220° F. for about one hour and then cooling and simultaneously aging said plates in air for about thirty-six hours at normal room temperature.

ALVA L. HINDALL.

REFERENCES CITED

The following references are of record in the file of this patent:

UNITED STATES PATENTS

| Number | Name | Date |
| --- | --- | --- |
| 1,806,180 | Reinhardt | May 19, 1931 |
| 2,035,746 | Hall | Mar. 31, 1936 |

FOREIGN PATENTS

| Number | Country | Date |
| --- | --- | --- |
| 115,865 | Great Britain | May 30, 1918 |